Figure 1:
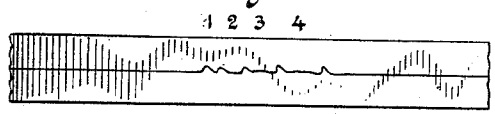

No. 756,468. PATENTED APR. 5, 1904.
C. G. BURKE.
CODE INDEX.
APPLICATION FILED MAY 26, 1902. RENEWED AUG. 4, 1903.
NO MODEL. 2 SHEETS—SHEET 1.

WITNESSES:
J. H. Freeman
Edwin Segal

INVENTOR
Charles G. Burke
BY
G. F. Crampton
ATTORNEY

No. 756,468. PATENTED APR. 5, 1904.
C. G. BURKE.
CODE INDEX.
APPLICATION FILED MAY 26, 1902. RENEWED AUG. 4, 1903.
NO MODEL. 2 SHEETS—SHEET 2.

WITNESSES:
INVENTOR
Charles G Burke
BY
ATTORNEY

No. 756,468. Patented April 5, 1904.

UNITED STATES PATENT OFFICE.

CHARLES GOODWIN BURKE, OF BROOKLYN, NEW YORK, ASSIGNOR OF SEVEN-TENTHS TO JOHN Q. A. WHITTEMORE, OF BOSTON, MASSACHUSETTS.

CODE-INDEX.

SPECIFICATION forming part of Letters Patent No. 756,468, dated April 5, 1904.

Application filed May 26, 1902. Renewed August 4, 1903. Serial No. 168,247. (No model.)

*To all whom it may concern:*

Be it known that I, CHARLES GOODWIN BURKE, a citizen of the United States, and a resident of Brooklyn, in the county of Kings and State of New York, have invented a certain new and useful Improved Code-Index, of which the following is a specification.

This invention relates to telegraphic signals for indicating or representing letters, numbers, or other characters which constitute what are known as "cipher" or "code" messages. It has for its object to provide an improved means which will permit of greatly-increased speed and more perfect accuracy in the transmission and deciphering of code or cipher messages over that which is obtained by the use of code-books now known in the art.

It consists in providing any number of complete signal combinations formed of single elemental signals and so arranged in relation to each other that they will indicate and signify the meaning associated with the complete signal.

It also consists in an improved method of electric communication between two points by means of sending any number of like impulses of an electric current, each impulse having a uniform duration of time and separated from the other impulses by varying periods of time, the combination of the periods of no current conveying the meaning of the signals thus produced.

It further consists in an improved article of manufacture in the form of an index of the signals which may be constructed as a card-index or a book-index. The index is made so as to be correlative with the signals, and by its peculiar features it permits of the use of single elemental signals to form complete signals for code telegraphy. The index is such that the single elemental signals specify in themselves the meaning of the signal by their location in the index.

In the present practice all code and cipher messages consist of words or combinations of figures, the signals used to indicate the letters of the words or figures of the combination constitute complete and separate signals, and each of such complete signals is formed of certain elemental signals arranged in different combinations, so that the words or combination of figures in each of the code-signals known heretofore are formed of as many complete signals as there are letters or numbers in the combination, which make the messages cumbersome. A meaning different from the meaning of the words or numerals themselves is arbitrarily attached to such words or combinations of figures. The words have no individual signification, but serve merely as a reference to like words and figure combinations in a code-book. All code and cipher messages as at present transmitted are telegraphed by the signals used in telegraphy for indicating the individual letters or figures, and inasmuch as the meaning of such messages depends entirely upon an exact correspondence letter for letter and figure for figure of the complete signals with similar combinations of letters and figures in the code-books absolute accuracy and great care are required in order to ascertain their intended meaning. In the present practice each word or combination is transmitted by sending a complete signal for each letter or figure of the word or combination. Each of the complete signals is formed of a number of elemental signals and is separated by a long space from the other complete signals. The complete word or cipher combination is thus formed of twice or three times the number of elemental signals as there are complete signals or as there are letters or figures in the combination. In practice it is found that the telegraphing or transmitting of each word or figure combination in the form of code and cipher messages in general use requires an average of from twenty-eight to thirty elemental signals and eight to ten complete signals. Since a period of time and space must intervene between each successive impulse and since it is necessary that an extra long space and interval of time be allowed between each individual letter or figure, the signals as formed in the present method of code telegraphy run out to a very great length.

In present methods of telegraphing it is also necessary that the electric impulse employed shall have a duration sufficiently long and a potential sufficiently high to energize the receiving instruments to such a degree that the record of each of the elemental parts of the signals shall be clearly and distinctly defined. This formation of signals by electrical impulses of long duration and high potential creates another difficulty in the transmission of the signals. The impulses of high-potential currents and of long duration charge the cables and other lines of large static capacity with large quantities of electricity, and consequently a long time is required for such lines to discharge after the charging-battery is cut off.

Where impulses of uniform duration are employed, the record will be uniform and the instruments readily kept in adjustment. The use of uniform impulses, particularly of short impulses, greatly reduces the length of time and space required for any complete signal.

The large number of electrical impulses now required for transmitting each complete code combination and the time required in spacing between the elemental signals and between the complete signals representing the separate letters or figures in the combination, together with the retardation due to the large static capacity of long submarine cables, makes telegraphing of such code-messages over such cables comparatively slow. The length of the signals for each message in the present practice necessarily limits the business that the cables can do. Inasmuch as code and cipher messages to-day constitute ninety-five per cent. of the business of submarine-cable companies, any improvement in the method of code signaling which materially reduces the time of the transmission directly increases the business capacity of such cables.

By my invention I provide a substitute for all present forms of code and cipher combinations. To my new code combinations similar meanings now used in the present code-books may be readily attached and may be telegraphed by a considerably fewer electrical impulses than any code combinations now in use. The impulses which I employ are of shorter and of uniform duration and lower potential than those ordinarily employed in telegraphy, and each complete code-message is formed of a single complete signal, which avoids long spacing in a single code-message. Thus I combine all the best features of signaling by electric impulses. Because of the large reduction of the number of electrical impulses which my improved code combinations secure, as well as by reason of their shorter and uniform duration and the absence of long spacing, it is found in practice that any meaning which can be expressed by the present form of code or cipher combinations may be as readily conveyed by means of my improved method of signaling in one-third the time now required and that the record is more readily and accurately deciphered and the meaning more quickly ascertained without any diminution of the present secrecy of code and cipher messages. These advantages will be apparent from the following description of my invention.

Figure 9:
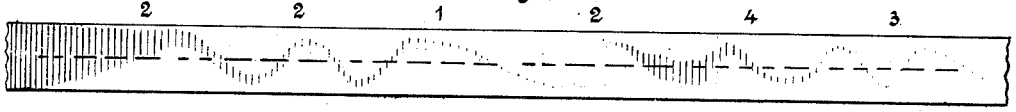
Figure 11:
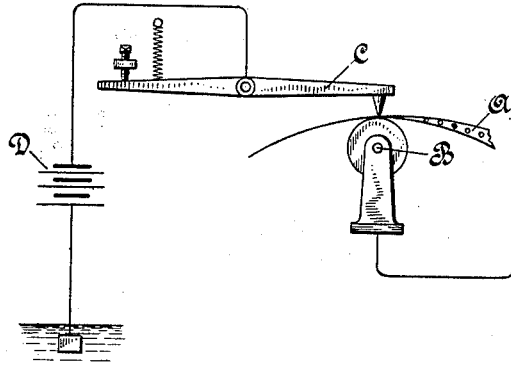
Figure 11:
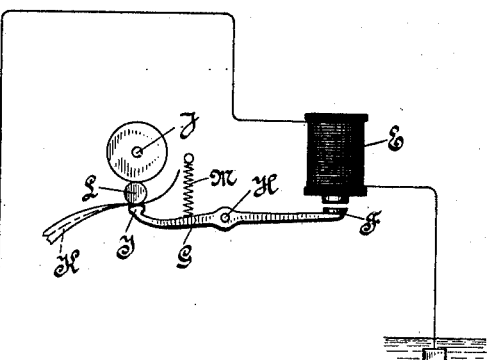
Figure 10:
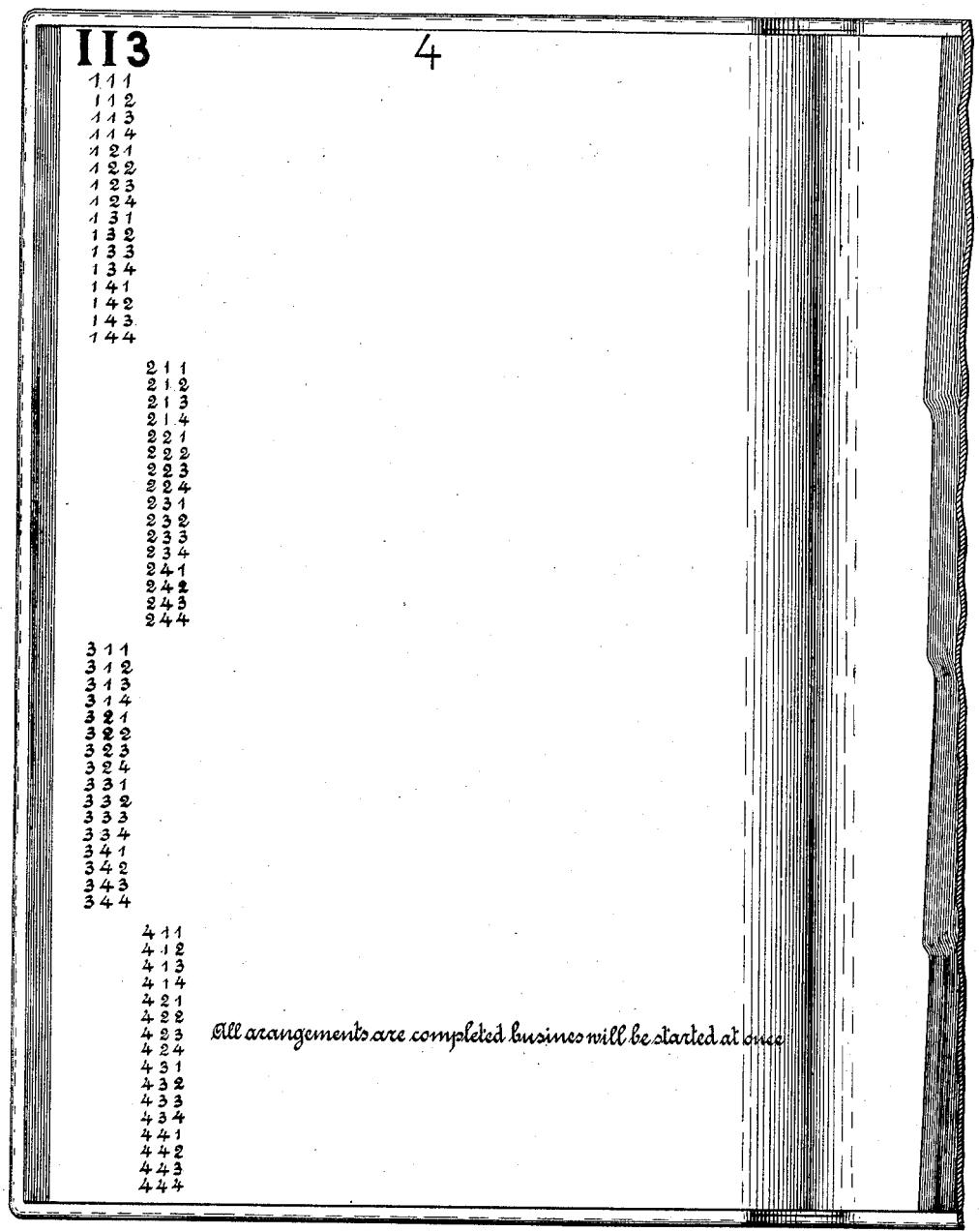

I have illustrated my invention in the accompanying drawings, wherein Figures 1 to 8, inclusive, illustrate the different forms of the signals used to indicate the location of the signals and their meanings in my improved index. Fig. 9 illustrates a signal as produced by the present Morse method of code-signaling, which is the same as the signal illustrated in Fig. 4, produced by my new and improved method of signaling. Fig. 10 illustrates an index-sheet of the code-book. Fig. 11 illustrates diagrammatically the circuit connections whereby the signals are transmitted from point to point.

In my present improvement I preferably use four elemental signals, which are illustrated in Fig. 1. These four elemental signals may be designated by numerals "1," "2," "3," and "4," or they may be designated by the letters "E I S H" or by the letters "T I M E" or "M A I N." Any signals or impulses which represent these letters may be used in place of the signals illustrated in Fig. 1.

The signals which are designated as above have varying lengths. The different lengths are easily discerned wherever they may be found. Each elemental signal may be associated with any number of other signals or it may be sent singly, and yet the characteristic length of the signal readily determines the nature of the signal. The elemental signals may be combined with any number of other elemental signals to form a complete code-message.

The signals are produced by first preparing a strip or ribbon in the manner well known in the art of telegraphy. The ribbon is perforated to form holes of uniform size or length at points varying in distance from each other according to the length of the elemental signals desired to be sent over the line. The distance between each hole is directly in accordance with the location of the complete signal or message in a code-index, this location being determined by the divisions and subdivisions of the code-index. If the signal is located in the code-index in one of the grand divisions, a signal corresponding in length to the location of the grand division with respect to the order of the grand division is sent. The location of the signal in the subdivision of the grand division is also determined by the length of the signal, and if the number of the subdivisions are greater than the number of the elemental signals used in the system the location of the signal in the subdivision of the grand division is determined by the order of the elemental signals and by their respective lengths, so that a ribbon may be prepared to send a signal by puncturing the ribbon at points in accordance with the position of the signal in the code-index as determined by the divisions and subdivisions of the index. The ribbon A thus prepared is passed through a transmitter. The transmitter consists of a roller B and a contact-maker C. The contact-maker is connected with the battery D, and the roller is connected to the line. Other connections can be provided for sending impulses on the line as the ribbon passes between the contact-maker C and the roller B. As the ribbon A passes under the contact-maker C the contact-point passes through the holes in the strip A and closes the circuit from the battery to the line through the roller. The ribbon is drawn through the transmitter at a uniform rate, so that the impulses sent over the line are of uniform duration; but the distance between the impulses varies in accordance with the distance between the points at which the ribbon is punctured. By this means signals are sent over the line which by their lengths directly indicate to the receiving-operator at the other end of the line the exact position in the code-index where will be found the interpretation of the signal. This obviously lessens the time required to find the meaning of the signals received from the line.

The means for recording the signal consists of an electromagnet E. This electromagnet E is directly connected to the line on one side and to the ground on the other side. The circuit is then completed through the ground to the battery. The electromagnet E operates upon an armature F, supported upon a lever G, pivoted at point H. This lever carries at the opposite end a platen I, over which there is passed at a uniform rate a blank ribbon K. Above this ribbon K and the platen I is located an inking-roller J. Associated with this inking-roller and coöperating therewith is a marking-roller L, having a blunt edge which is in position to press upon the blank ribbon when the same is raised by the operation of the platen I. When the electromagnet operates upon its armature F, the platen is drawn down and carries with it the blank ribbon K, and the marking upon the ribbon by the marker L ceases. When, however, the electromagnet ceases to be energized by the impulses coming over the line, the platen is raised by the operation of the spring M, and the marking continues. Therefore during the time that there is no current upon the connecting-line the marker L is forming a continuous line upon the ribbon K, and when impulses are sent over the line the marker ceases to mark the ribbon K. The marks produced upon blank ribbon K vary in length in exact accordance as the distance between the points at which the ribbon A is punctured, and inasmuch as the ribbon A is punctured at points which are located from each other in exact accordance to the location of the signal in a code-index, which signal is to be sent over the line, the length of the marks produced upon the blank ribbon K will indicate the exact position in the code-index where that same signal is to be found.

Figure 2:
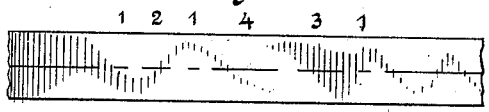
Figure 3:
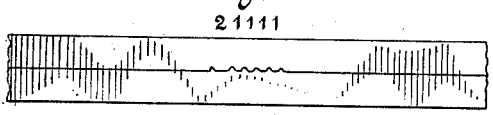
Figure 4:
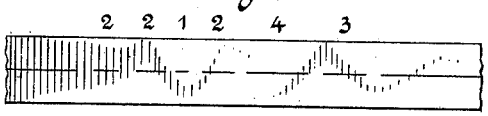
Figure 5:
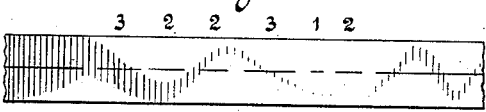
Figure 6:
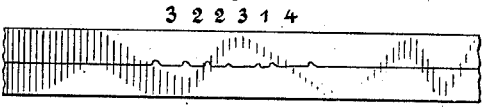
Figure 7:
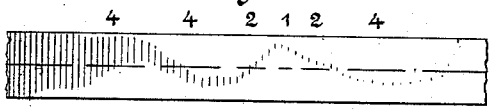
Figure 8:
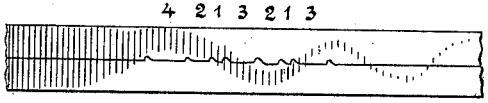

The signals designated by the numerals "1," "2," "3," and "4" or other designating terms permit of the formation of a large number of complete signals. In combinations of five of the elemental signals using the four elemental signals there are one thousand and twenty-four complete signals as against thirty-two in the present system of telegraphy for sending signals; in combinations of six elemental signals, four thousand and ninety-six as against sixty-four in the present system of telegraphy. In combinations of eight there are sixty-five thousand five hundred and twenty-six as against two hundred and fifty-six. In combinations of nine there are two hundred and sixty-two thousand one hundred and four as against five hundred and twelve. In combinations of ten there are one million forty-eight thousand four hundred and sixteen as against one thousand and twenty-four. It will therefore be seen that without exceeding ten of these numerals or elemental signals in any one combination there are formed by the summation of the above signals one million three hundred and ninety-seven thousand five hundred and fifty distinct complete signals, to each of which may be assigned a different meaning, as against one thousand eight hundred and eighty-eight in the present code of signaling. In practice it will not be needed to provide more than from one to two hundred thousand of these separate combinations, and inasmuch as the signals shown in Fig. 1 require but one electric impulse to define any one elemental signal in a combination of elemental signals, except the last elemental signal in the combination, which needs a final impulse, none of my improved combinations up to three hundred and forty-nine thousand one hundred and forty-four will require more than ten electric impulses as against thirty-five or forty elemental signals required to produce the message now used in the present code of telegraphy. The code of signals which permit of this reduction in the length of time for sending the signal is formed by arranging any number of signals in different orders, as shown in Figs. 1 to 8, consecutively. The signals are formed by changing the order and combinations of the elemental signals, the different signals being characterized by this difference in order of the elemental signals and by the different elemental signals that are used in each complete signal, as appears from the showing in the drawings. In Fig. 1 is illustrated the four elemental signals. In Figs. 2 to 8 are shown the different ways in which the elemental signals may be arranged in order to designate their different meanings. In Fig. 2 is shown a complete signal forming a single complete message which is composed of six elemental signals. The first elemental signal is of unit length, the second is of two units length, the third is of one unit length, the fourth is of four units length, the fifth is of three units length, and the sixth is of one unit length. The elemental signals are separated by a uniform space. By their different lengths and orders they indicate the line of the book or subsection of the index where the messages are located. In each case the first signal may be used to indicate the grand division of the index, the last three to indicate the line, and the remaining signals to indicate the section or page of the code-index. It will be seen by designating these signals by numerals, which numerals indicate the relative lengths of the different signals, the number of the grand division and the number of the section and the number of the subsection is readily indicated by the complete signals, so that the location of the signal in the code-index is thus readily indicated.

The signals, as I have stated above, may have any designating terms; but I preferably use numerals for designating the signals, so that my new and improved index may readily show the meaning of the signals. The signals are designated in the order of their relative lengths as "1," "2," "3," and "4." A similar index could of course be made by using other designating terms, such as those suggested above; but numerals are much more readily grasped by the mind, as the relative lengths of the signals suggest at once the numeral, and the numeral immediately gives the position of the message in the index. First, the relative lengths of the signals readily indicate to the mind and constitute, in fact, a picture to the eye as the signals are read of the exact location of the signals in the code-index. This is much more apparent than if letters are used to designate the signals or if the signals are made up of a number of elemental signals, as in the present Morse system; second, the order thus quickly taken in by the mind is readily utilized in locating the interpretation or the meaning of the signal in the code-index. Thus the signals indicate their position in the index without any interpretation of what the signals mean in themselves, which in the present form of signaling is necessary before finding the interpreted meaning in a code-book. By means of my new and improved index I am enabled to locate the meaning in the index by the signal itself.

The signal-index is formed into four grand divisions. Each division is divided into a number of sections and each section is composed of sixty-four subsections. Each subsection has an interpretation of that signal which designates that particular subsection. The elemental signals indicate by their relative lengths the grand divisions, the sections, and the subsections of the index. The first grand division contains all of the signals beginning with numeral "1," the second grand division contains all beginning with numeral "2," and so on. The different sections are designated by the combinations of the next two or three elemental signals and contain all the combinations of the last three elemental signals of the complete signal.

The index may be made in the form of a card-index, each card constituting a subsection and having an interpretation of the signal designating the card. I preferably make the index in the form of a book. The book is divided into parts corresponding to the grand divisions of the index, and the leaves of the parts correspond to the sections of the index. Each leaf contains the subsections, which are arranged in order down the page. If then a signal is to be sent or received, the location of the signal in the code-index is transmitted over the line and received at the other end of the line, the two operators merely noting by the different signals the location of the line of the page or the particular card of the subsection of the index.

In Fig. 10 is illustrated the preferable form of my code-index—namely, a book. In the said figure is also illustrated a single page of the book, showing the designating terms of the signals, whereby the exact position of the index-signal is located. The particular part of the book is indicated numerically by the length of the first elemental signal, the signals being, as stated above, numerically indicated by "1," "2," "3," and "4," according to their increased length. The shortest signal will indicate a grand division or part No. 1 of the book. No. 2 signal will indicate part No. 2 of the book. No. 3 signal will indicate part No. 3 of the book, and No. 4, or the longest signal, will indicate part No. 4 of the book. The subsequent two or three signals will indicate the exact page of the book-index or the exact subdivision of the card-index. The pages of the index are arranged in each part in the consecutive order of the varying lengths of the signals. The pages are numbered according to sequence of the permutations of the different elemental signals that are used.

The last three elemental signals of any complete signal or message designate the particular line in which the meaning of that particular signal is found. As there are sixty-four different permutations of three of the elemental signals there will be sixty-four divisions or lines on each page, which will provide for sixty-four different subjects for messages on each page. The lines as designated by the last three elemental signals of the complete signal are arranged in the order of the sequence of the different permutations of the elemental signals.

In Fig. 10 is represented a page of the fourth part of the book. All of the complete signals which refer to this part of the book will, as explained above, begin with the longest signal. The particular page illustrated is numbered 113. In order to designate this particular page, the elemental signals which follow the first or the longest of the two elemental signals will consist of the two elemental signals of single unit length and then one elemental signal of three units length. This will indicate to the operator receiving the signal that the meaning is found on page 113 of part 4 of the code-index. The last three elemental signals will indicate the particular line on this particular page in which the meaning of the particular complete signal is to be found. If the last three elemental signals consist of the signals designated by "4 2 3," the operator receiving the signal will know that it is found in that line or subdivision on page 113 of part 4. The designating-number of the part of the index may be inserted on each page, or the page-number may begin with the designating-number of the part in which the page is located.

If, for illustration, the message "All arrangements are completed. Business will be started at once" is to be sent over the cable, the transmitting operator will merely send the signals corresponding to the part of the book, the page of the book, and the line of the particular page in which that signal is found. In this particular case he will send first the longest signal, (designated by the numeral "4,") then the two short signals, (designated by numerals "1 1,") then the signal designated by the numeral "3." Then he will follow with the signals designating the line—namely, the signals corresponding in length to the numbers "4 2 3." The receiver of the message in reading the signal will merely turn to part 4, as indicated by the first signal, then to page 113, as designated by the following three signals, and then to line 423, as designated by the last three signals, which will indicate to him at once the meaning transmitted by the elemental figures, and the receiver of the message will immediately obtain the message sent by the transmitting operator.

I have illustrated merely the preferable embodiment of my invention; but this form may be varied by those skilled in the art without in any way departing from the spirit thereof. Short signals of any form may be used in place of the particular elemental signals that I have designated, and any designating terms may be used in indicating the different signals which I have represented.

What I claim as new, and desire to secure by Letters Patent, is—

1. In a signal-code, an index for signals having a plurality of divisions and subdivisions arranged in accordance to the order and length of the elemental parts of the said signals.

2. In a signal-code, an index for signals having a plurality of divisions indicated by the different lengths of the elemental signals, a plurality of subdivisions arranged in accordance to the length and order of the elemental parts of the said signals.

3. In a signal-code, an index for signals having as many divisions as there are varying lengths and orders of the elemental parts of the said signals.

4. In a signal-code, an index for signals having as many divisions as there are varying lengths and orders of elemental signals of the said signals, the said divisions being arranged in the order of increasing length of the said elemental signals and the sequence of changes in varying lengths of the different elemental signals of each complete signal.

5. In a signal-code, an index for signals having as many grand divisions as there are elemental signals and having as many subdivisions as there are changes in order of the elemental signals.

6. In a signal-code, an index for signals having divisions and subdivisions, the divisions being designated by single elemental signals of the said signals, and the subdivisions being designated by the changes in order of the single elemental signals of the said signals.

7. In a signal-code, an index for signals having a plurality of grand divisions and subdivisions, each grand division containing signals having their first elemental signals of the same length and each of the subdivisions having as many signals as there are orders of a part of the elemental signals of the said signals.

8. In a signal-code, an index for signals having a plurality of grand divisions and subdivisions, each grand division being indicated by the first elemental signal of the said signals and each of the subdivisions being indicated by the orders of the remaining of the said signals.

9. In a signal-code, an index for signals having a plurality of grand divisions and subdivisions each grand division containing all the signals having their first elemental signals of the same length and each of the subdivisions as many signals as there are orders in the varying lengths of the last three elemental signals of the said signal, and each grand division having as many subdivisions as there are orders in the remaining elemental signals of the complete signal.

10. In a signal-code, a book divided into four parts containing signals which have their first elemental signals of the same length and which correspond in length according to the number of the part in which the said signals are located, each page of the parts of the book having the signals indicated by the last three elemental signals and which pages are indicated by the remaining elemental signals whereby the exact location of the page of the book is indicated by the signal.

11. In a signal-code, a book for containing the said signals, the said book having as many parts as there are varying lengths in the elemental signals, each part being designated by the different elemental signals, the pages of the said parts being designated by the orders and lengths of the remaining elemental signals with the exception of the last three elemental signals, the line of the pages being designated by the orders and lengths of the last three elemental signals.

In testimony whereof I have signed my name to this specification in the presence of two subscribing witnesses.

CHARLES GOODWIN BURKE.

Witnesses:
FAUST T. CRAMPTON,
EDWIN SEGER.